Figure 1:
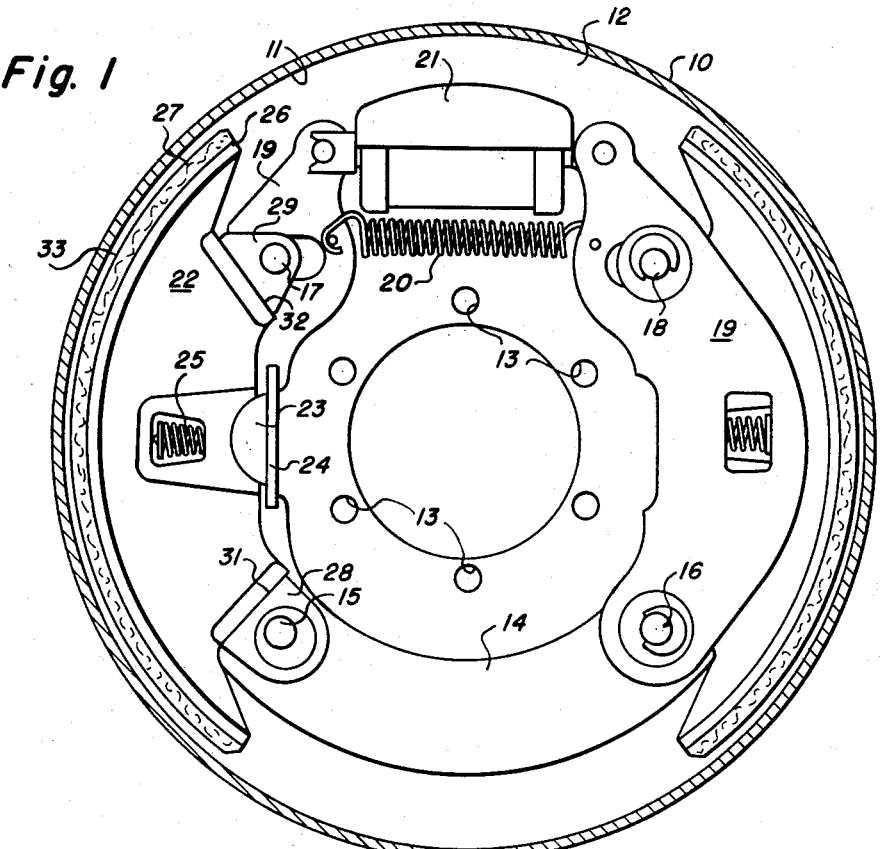

June 12, 1956 R. K. SUPER 2,750,006
BRAKE
Filed July 3, 1950

INVENTOR
Ralph K. Super
BY
Strauch, Nolan & Diggins
ATTORNEYS

United States Patent Office 2,750,006
Patented June 12, 1956

2,750,006

BRAKE

Ralph K. Super, Ashtabula, Ohio, assignor, by mesne assignments, to Rockwell Spring and Axle Company, Coraopolis, Pa., a corporation of Pennsylvania Application July 3, 1950, Serial No. 171,792

4 Claims. (Cl. 188—78)

This invention relates to wheel brakes for automotive and other vehicles and is particularly directed to a novel brake assembly wherein the radius of curvature of the cylindrical braking surface of the lining is slightly less than the radius of curvature of the cylindrical inner surface of the drum to which it is adapted to be applied.

In most conventional vehicle wheel braking systems in use today, a pair of brake shoes are simultaneously rocked about independent pivots to bring the lining on the peripheral surface of the shoe, which lining has a cylindrical outer surface, into contact with the smooth cylindrical inner surface of the brake drum. The brake drum is invariably an axially short metal cylinder having its internal surface smooth and providing a substantially true cylinder about the axis of rotation of the wheel to which it is secured. The brake shoes are pivoted at adjacent ends at one side of that axis, and are usually spread apart by a hydraulic or other actuator located between the other ends of the shoes on the other side of the axis, this whole assembly being mounted on a spider or other support fixed to the axle housing so that all of the brake reaction forces encountered when the spreading shoes contact the drum are transmitted through the support to the axle housing which is usually provided with counteracting torque resisting connections for preventing relative rotation between the axle housing and the vehicle body.

In most of these prior constructions, the brake shoe itself is a relatively rigid metal member with an external peripheral rim surface having an extent of somewhat less than half of the circumference of the braking surface of the brake drum and the brake lining is usually a uniform width strip of friction material secured upon the brake shoe rim surface as by rivets, cement or even bolts in the case of some heavy duty lining. The usual friction lining has a cylindrical external peripheral surface the radius of which is equal to the radius of the inner periphery of the brake drum.

It has long been considered that the optimum condition during braking was with the entire lining surface simultaneously in contact with the braking surface of the drum with substantially equal force at all points along the length of contact. Hence, it has been considered necessary to make the outer periphery of the lining and the inner periphery of the brake drum which are in contact when the brake is fully applied of substantially the same diameter, both having a common center at the center of revolution of the brake drum when the brake is in fully applied position.

To obtain this condition many different and complex braking arrangements have been tried and most of them found unsuccessful. Brake shoes displaced only radially have been tried but to my knowledge none of them is in common use today, as the mechanism for actuating them is either too expensive or impractical. In any event, the majority of the commercial brakes in vehicles today comprise the independently pivoted shoe arrangement spread by a single actuator above described, and it is in connection with the operation of this type of brake that many lining wear problems have arisen and many suggestions have been made for the purpose of correcting the improper wear patterns.

It has been recognized that the major cause of improper lining wear is due to "chatter" of the brake shoes which is a vibration resulting from counteracting forces imparted to the brake shoes by the rotating brake drum.

A rotating brake drum having a brake shoe engaged therewith sets up forces along the entire braking surface of the shoe that tend to rotate the shoe either toward or away from the drum.

Chatter results when there is a substantial balance between the forces tending to rotate the shoe toward and away from the drum and one is constantly overcoming the other.

Under braking pressures a brake drum deflects slightly and becomes substantially elliptical in shape having its major axis passing substantially through the centers of the pressure areas of the brake shoes. If, as in conventional brakes, the radius of the braking surface of the brake lining is the same as the normal radius of the free drum and the brake shoes are relatively rigid, then under braking pressures greater pressure is applied at the ends of the shoe and a relatively light pressure at the center of the shoe.

In most brakes having drum rotation forces that tend to rotate the shoe toward the drum, these forces act on the shoe adjacent its ends. If by reason of drum deflection as just described these ends become high pressure areas where the forces tend to rotate the shoe away from the drum there is a great possibility of creating a substantial balance between the forces tending to rotate the shoe toward the drum and those tending to rotate it away from the drum, thus causing chatter.

When a condition of chatter is developed in a brake it generally continues throughout the life of the brake as the chatter makes it impossible for the brake to develop a proper pattern of wear.

I have found that the undesirable condition may be remedied by the simple expedient of reducing the diameter of the cylindrical curvature of the outer surface of the lining on the brake shoe relative to the diameter of the cylindrical curvature of the interior surface of the brake drum contacted by the brake lining.

As a matter of practice I have found that in brakes for commercial automotive vehicles, ranging in diameter from approximately 14" to 20" and having lining of Gogan hardness readings ranging from 11 to 17, a decrease of the radius of the braking surface of the lining ranging between .025 to .050 inch, with approximately .035 inch preferred, solves the problem of chatter.

The above Gogan hardness readings represent maximum depths of penetration in thousandths of an inch as determined in a Gogan testing machine wherein a plunger ¾" in diameter and having a flat ground face was preloaded with a 500 kilogram load and released to penetrate the lining surface and then a load of 3000 kilograms applied and maintained on the plunger while measuring the depth of penetration. During the test the lining is supported on a curved anvil like the brake shoe.

It is therefore a major object of my invention to provide a novel brake having improved brake lining wear characteristics and wherein the brake lining of a pivoted shoe assembly has a cylindrical curvature at least at both ends greater than the cylindrical curvature of the internal surface of the brake drum with which it is brought into contact during rotation of the wheel.

Figure 2:
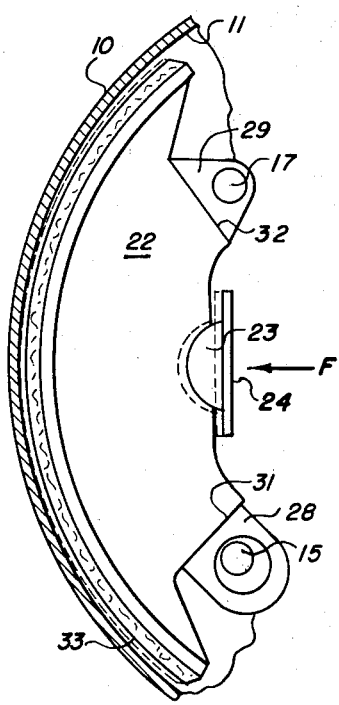

Further objects of the invention will appear as the description proceeds in connection with the appended claims and the annexed drawing in which Figure 1 illustrates a brake assembly according to a preferred embodiment of the invention; and Figure 2 illustrates the invention diagrammatically.

Referring to the drawing, a brake drum 10 is formed of suitable metal and has a smooth internal cylindrical surface 11. Drum 10 is attached to a rotatable wheel (not shown) adapted to support an axle (also not shown).

A backing plate 12 substantially closes the inner end of the brake drum and is affixed to a suitable flange on the axle housing by rivets or other fastening means passing through apertures 13. A suitable rib 14 is circumferentially formed in plate 12 for reinforcing it against lateral distortion. Plate 12 is provided with a set of lower anchor pins 15 and 16 and upper pins 17 and 18 which are rigid with the plate and project therefrom toward the interior of the brake drum. A pair of levers 19 are pivoted on the respective lower anchor pins 15 and 16 and operatively connected at their upper ends to opposite sides of a hydraulic brake actuator 21 and a tension spring 20, the function of the hydraulic actuator being to spread the brake shoes by oppositely rocking them about their pivots, and the function of the spring 20 being to retract the shoes to the illustrated relaxed position when the brakes are not applied.

Brake shoe pivots 15 and 16 are preferably equally spaced on opposite sides of a vertical plane through the axis of rotation of drum 10.

Each brake lever 19 comprises a pair of plates that embrace a brake shoe 22 which is rockably and slidably connected to its lever 19 as by a block 23 that has an arcuate surface fitting into a suitable socket in the brake shoe for relative rocking and an opposite flat surface slidably engaging a saddle bar 24 rigid with lever 19. A spring 25 disposed in an aperture in the brake shoe reacts between the brake shoe and the lever to tend to maintain the shoe against the block 23 during braking operations.

Each brake shoe 22 is formed with a cylindrical rim 26 upon which is attached a strip of uniform thickness relatively hard friction lining material 27 that is adapted to engage the cylindrical inner periphery 10 of the brake drum.

In the brake according to the illustrated embodiment, the anchor pins 15 and 17, as illustrated on the left side of the drawing where the upper plate of lever 19 has been omitted for purposes of clarity of disclosure, rockably carry abutment blocks 28 and 29 which are formed with smooth flat surfaces 31 and 32, respectively, adapted to slidingly engage similar flat equally inclined surfaces at opposite ends of the brake shoe in the assembly. This arrangement permits outward displacement of the shoes in a substantially radial direction only when the brake is applied, the rocking sliding connection between the shoe and lever and the free rocking of the abutment blocks permitting and guiding the shoe in this movement.

This general construction above described is the same as that disclosed in Buckendale et al. Patent No. 2,432,983 and it has been found to be superior to other types of braking mechanism for obtaining maximum efficiency of brake operation in that the braking forces are the same for either direction of rotation of the wheel.

In operation of this type of patented brake, when the vehicle operator steps on the brake pedal, the actuator 21 expands to equally move the free ends of brake levers 19 outwardly, thereby swinging each lever and the brake shoe carried by it toward the surface 11 of the brake drum. Friction between surface 11 and the lining 27 of brake shoe 22 will cause the brake shoe to tend to rotate with the brake drum. This however is resisted by contact of the shoe upon surface 31 of the lower abutment block 28 when the drum 11 in the drawing is rotating in a counter-clockwise direction and by surface 32 on upper abutment block 29 when the drum is rotating in a clockwise direction.

Because of the pressure exerted by the shoes 22 the drum 10 will deflect slightly to form an ellipse having its major axis substantially between the ends of the shoe. As the shoes 22 are relatively rigid, the points of greatest pressure will be the ends of the shoes, the drum on deflecting moving away from the center area of the shoes and moving toward the end areas.

Due to this deflection the upper and lower ends of the brake lining are the points of greatest pressure, if not the only points of contact, and there is a great possibility of creating a substantial balance between the forces tending to rotate the brake shoes toward the drum and those tending to rotate them away from the drum. As the ends of the brake lining are the points of greatest pressure for longer periods, the lining at these points may sear and become hard and brittle so that in a great many, if not most cases, the lining will be hindered from breaking in to its correct wear pattern wherein the pressure between the lining and drum would be substantially equal at all points.

I have found according to the present invention that the lining may be permitted to wear in properly by slightly reducing the radius of curvature of cylindrical lining surface 33 with respect to surface 11 instead of making them equal. In practice I have found in most cases it is desirable to provide about a .035 inch difference in these radii.

This means that when each brake lever and shoe assembly is swung outwardly toward the brake drum, the lining contour is such that initial contact of the lining on the drum is intermediate the ends of the lining and initial end contact is effectively avoided. After the drum is deflected under the braking pressures there are but light pressures (if any drum contact at all) on the ends of the brake lining thereby eliminating the possibility of developing brake chatter through relatively high end pressures with respect to the center lining pressures. The brake will now wear in to conform substantially to the average deflected contour of the drum and the brake pressures over the entire surface of the lining will be substantially equal.

As illustrated diagrammatically in Figure 2, the brake applying force through the medium of lever 19 and block 23 is effective substantially at the middle of the shoe. This force is represented by F in Figure 2. Due to the smaller radius of curvature of lining surface 33, in the invention the central area of the lining surface 33 first contacts surface 11 when the brake is applied and the force F is effective directly through that central area and the automatic centering action of the shoes takes place quickly and relatively easily.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and changes, which come within the meaning and range of equivalency of the claims, are therefore intended to be embraced therein.

What is claimed and desired to be secured by United States Letters Patent is:

1. In a brake having a metal brake drum between 14 and 20 inches in diameter and adapted to rotate about an axis and having an internal smooth normally cylindrical braking surface, a brake shoe assembly comprising a pair of rigid brake shoes mounted for pivotal movement toward and from said braking surface, and a friction lining on each shoe having a Gogan hardness of approximately 11 to 17 and an external continuously curved surface which at least adjacent both ends lies in a cylindrical envelope having a fixed radius of curvature between .025" and .050" less than the radius of curvature of the adjacent braking surface.

2. In a brake, a metal brake drum having a normally cylindrical inner brake surface ranging in diameter substantially between 14 and 20 inches, a pivoted lever, a rigid arcuate brake shoe rockably and slidably connected to said lever, and a lining of friction material on said brake shoe having a continuously curved external peripheral surface which at least at both ends lies in a cylindrical envelope of a fixed radius of curvature between .025" and .050" less than the radius of curvature of said brake drum surface.

3. In a brake assembly of the type characterized by a metal brake drum having an internal cylindrical braking surface between 14 and 20 inches in diameter, the provision of an associated brake shoe assembly comprising a pair of rigid brake shoes mounted for pivotal movement toward and away from said braking surface, and a friction lining on each shoe having a Gogan hardness of approximately 11 to 17 throughout and an external continuously curved surface which at least adjacent both ends lies in a cylindrical envelope having a fixed radius of curvature between .025" and .050" less than the radius of curvature of the braking surface of the drum associated therewith.

4. For use in a vehicle brake assembly of the type characterized by a metal brake drum having an internal cylindrical braking surface between 14 and 20 inches in diameter and an associated brake shoe assembly comprising at least one rigid arcuate brake shoe mounted for pivotal movement toward and away from said braking surface, a friction lining adapted to be fixedly mounted on said shoe having a Gogan hardness of approximately 11 to 17 throughout and an external continuously curved surface which at least adjacent both ends lies in a cylindrical envelope having a fixed radius of curvature between .025" and .050" less than the radius of curvature of the braking surface of said drum associated therewith.

References Cited in the file of this patent

UNITED STATES PATENTS

| | | |
|---|---|---|
| 1,699,307 | North | Jan. 15, 1929 |
| 1,919,542 | Dick | July 25, 1933 |
| 1,928,095 | Dick | Sept. 26, 1933 |
| 2,386,645 | Williams | Oct. 9, 1945 |
| 2,432,983 | Buckendale et al. | Dec. 23, 1947 |

FOREIGN PATENTS

| | | |
|---|---|---|
| 384,925 | Great Britain | Dec. 15, 1932 |